US012803967B2

(12) United States Patent
Faulhaber et al.

(10) Patent No.: US 12,803,967 B2
(45) Date of Patent: Nov. 17, 2026

(54) SYSTEMS AND METHODS FOR CONNECTING TO SECURE COMPUTER SYSTEMS

(71) Applicant: SAP SE, Walldorf (DE)

(72) Inventors: Veronika Faulhaber, Rauenberg (DE); Norbert Ottahal, Mannheim (DE); Ralf-Dietmar Dittman, St. Leon-Rot (DE); Timo Ellenberger, Schifferstadt (DE); Mathis Wieder, Ketsch (DE); Stefan Sturm, Russelsheim (DE); Yves Lorat, Walldorf (DE); Guilherme Limongi de Oliveira, Mannheim (DE); Christopher Black, Penn Valley, CA (US)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 18/464,009

(22) Filed: Sep. 8, 2023

(65) Prior Publication Data

US 2025/0088498 A1 Mar. 13, 2025

(51) Int. Cl.
*H04L 29/06* (2006.01)
*H04L 9/40* (2022.01)

(52) U.S. Cl.
CPC ...... *H04L 63/0823* (2013.01); *H04L 63/0281* (2013.01); *H04L 63/083* (2013.01); *H04L 63/102* (2013.01)

(58) Field of Classification Search
CPC ............. H04L 63/0823; H04L 63/0281; H04L 63/083; H04L 63/102
See application file for complete search history.

(56) References Cited

U.S. PATENT DOCUMENTS

| | | | | |
|---|---|---|---|---|
| 6,539,483 | B1 * | 3/2003 | Harrison | H04L 12/4641 726/1 |
| 7,284,068 | B1 | 10/2007 | Ramalho | |
| 7,334,018 | B2 | 2/2008 | Elms | |
| 7,590,987 | B2 | 9/2009 | Behrendt et al. | |
| 7,703,024 | B2 | 4/2010 | Kautzleben et al. | |
| 7,818,721 | B2 | 10/2010 | Sundararajan et al. | |
| 7,849,445 | B2 | 12/2010 | Tran | |

(Continued)

OTHER PUBLICATIONS

M. Anisetti et al., A Certification Framework for Cloud-based Services, Apr. 4, 2016, ACM, pp. 440-447. (Year: 2016).*

(Continued)

*Primary Examiner* — Luu T Pham
*Assistant Examiner* — Fahimeh Mohammadi
(74) *Attorney, Agent, or Firm* — Fountainhead Law Group, PC

(57) ABSTRACT

Embodiments of the present disclosure include techniques for securely connecting computer systems. In one embodiment, the system allows many users to connect with many different secure computer systems having many different connection types. A user selects an entity and is presented with connection types for the selected entity for the entities target systems. The user selects a connection type and corresponding target, and a tunnel proxy server is configured to connect the user to the selected target. In some embodiments, the connection type is associated with other information. In one embodiment, an application associated with the connection type is automatically launched.

18 Claims, 5 Drawing Sheets

(56) References Cited

U.S. PATENT DOCUMENTS

| | | | |
|---|---|---|---|
| 7,945,677 B2 | 5/2011 | Fleischer et al. | |
| 8,161,169 B2 | 4/2012 | Fleischer et al. | |
| 8,438,535 B2 | 5/2013 | Sun | |
| 8,555,176 B2 | 10/2013 | Elumalai et al. | |
| 9,117,019 B2 | 8/2015 | Wintergerst et al. | |
| 9,183,540 B2 | 11/2015 | Eberlein et al. | |
| 9,420,002 B1 * | 8/2016 | McGovern | H04L 63/20 |
| 9,571,457 B1 * | 2/2017 | Hoy | H04L 63/0272 |
| 9,762,613 B2 | 9/2017 | Cherukuri et al. | |
| 9,807,169 B2 | 10/2017 | Blumenthal-Barby et al. | |
| 9,860,249 B2 * | 1/2018 | Dulkin | H04L 63/0884 |
| 10,511,584 B1 * | 12/2019 | Baer | H04L 63/029 |
| 10,958,662 B1 * | 3/2021 | Sole | H04L 63/0853 |
| 10,992,744 B1 * | 4/2021 | Kutuzov | H04L 67/1012 |
| 11,570,269 B2 | 1/2023 | Dittmann et al. | |
| 11,601,288 B1 * | 3/2023 | Bacon | H04L 63/205 |
| 12,199,827 B1 * | 1/2025 | Shah | H04L 41/12 |
| 2005/0086533 A1 * | 4/2005 | Hsieh | H04L 63/145<br>726/4 |
| 2005/0088977 A1 * | 4/2005 | Roch | H04L 47/10<br>370/254 |
| 2005/0198501 A1 | 9/2005 | Andreev et al. | |
| 2007/0245007 A1 | 10/2007 | Tsirtsis et al. | |
| 2008/0052509 A1 * | 2/2008 | Ahmed | H04L 63/02<br>713/156 |
| 2010/0023602 A1 | 1/2010 | Martone | |
| 2013/0086218 A1 | 4/2013 | Adams et al. | |
| 2013/0239172 A1 | 9/2013 | Murakami et al. | |
| 2014/0056172 A1 * | 2/2014 | Lee | H04B 10/116<br>370/254 |
| 2014/0128050 A1 * | 5/2014 | Bas Sanchez | H04L 65/1069<br>455/418 |
| 2014/0157398 A1 | 6/2014 | Mckinney | |
| 2015/0271162 A1 | 9/2015 | Dulkin et al. | |
| 2015/0372982 A1 * | 12/2015 | Herle | H04L 63/0272<br>726/15 |
| 2016/0371172 A1 | 12/2016 | Rumsey | |
| 2017/0223063 A1 | 8/2017 | Herrero | |
| 2018/0176193 A1 * | 6/2018 | Davis | H04L 9/3247 |
| 2018/0262347 A1 * | 9/2018 | Levy | H04L 9/006 |
| 2019/0372983 A1 * | 12/2019 | Trabelsi | G06F 9/45558 |
| 2021/0149788 A1 | 5/2021 | Downie et al. | |
| 2021/0266303 A1 * | 8/2021 | Pollutro | H04L 63/0435 |
| 2021/0306275 A1 | 9/2021 | Ke | |
| 2022/0103525 A1 | 3/2022 | Shribman et al. | |
| 2022/0174045 A1 * | 6/2022 | El-Moussa | H04L 12/4633 |

OTHER PUBLICATIONS

William Enck et al., On Lightweight Mobile Phone Application Certification, Nov. 9, 2009, ACM, pp. 235-245. (Year: 2009).*

M. Sadegh Riazi et al., Chameleon: A Hybrid Secure Computation Framework for Machine Learning Applications, May 29, 2018, ACM, pp. 707-721. (Year: 2018).*

Chang Liu et al., ObliVM: A Programming Framework for Secure Computation, Jul. 20, 2015, IEEE, pp. 359-376. (Year: 2015).*

Dondeti, "SAP Remote Access and Connectivity (SAP RAC)", available from https://blogs .sap.com/2019/01/03/sap-remote-access-and-connectivity-sap-rac/, 10 pages (Jan. 2019).

SAP, "Connecting to a Remote System", downloaded from https:// help. sap.com/viewer/8c44 f 49685f 44be4aa420bbf6393aeea/7 .3 . 20/en-US/47bla87eac671599e10000000a42189c.html on Aug. 17, 2020, 2 pages.

SAP, "Enabling/Disabling Remote Access in FPN Connections", downloaded from https://help.sap.com/doc/saphelp_nw73ehp 1/7 . 31.19/en-US/49/5c8ef94a662221e10000000a42189d/content.htm? no_cache=true on Aug. 17, 2020, 2 pages.

SAP, "Remote Support", downloaded from https ://support.sap . com/ en/tools/ connecti vity-tools/remote-support.html#section on Aug. 17, 2020, 6 pages.

SAP, "SAP Integration and Certification Center", available from https://www .sap.com/docs/download/2017 /02/683dl 10c-a77c-OO10-82c7- eda71af511fa.pdf, pp. 1-8 (apparent date May 2020).

SAP, "Setting Up Service Connections for SAP Remote Support", downloaded from https://help.sap.com/saphelp_nwpi711/helpdata/ en/96/ea39e6feb4457793cb00dlfee 4e8fd/content.htm?no_cache= true on Aug. 17, 2020, 2 pages.

* cited by examiner

SYSTEMS AND METHODS FOR CONNECTING TO SECURE COMPUTER SYSTEMS

BACKGROUND

The present disclosure relates generally to software systems, and in particular, to systems and methods for connecting to secure computing systems.

Enterprise IT landscapes have been evolving in over the years with mix of new cloud delivered services and on-premise software systems. As these systems become more ubiquitous, challenges arise in providing support for such systems by the venders who develop them. Software vendors must provide some ability to provide remote access to such systems for various internal stakeholders, vendor support engineers, and other authorized third parties.

Remote connectivity is a technique used to deliver many services such as, but not limited to, consulting, custom development, and technical support. However, a secure infrastructure must be provided with dedicated connection types ensuring maximum compatibility with a wide variety of system deployments, product architectures, solutions, and platforms both on premises and in a cloud environment. Managing and using contemporary point to point connection methods can be time consuming and unworkable in situations where a software vendor has many customers each with extensive system deployments.

The present disclosure addresses these and other challenges and is directed to techniques for secure remote connections to third party computer systems.

DETAILED DESCRIPTION

Described herein are techniques for connecting to secure computing systems. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
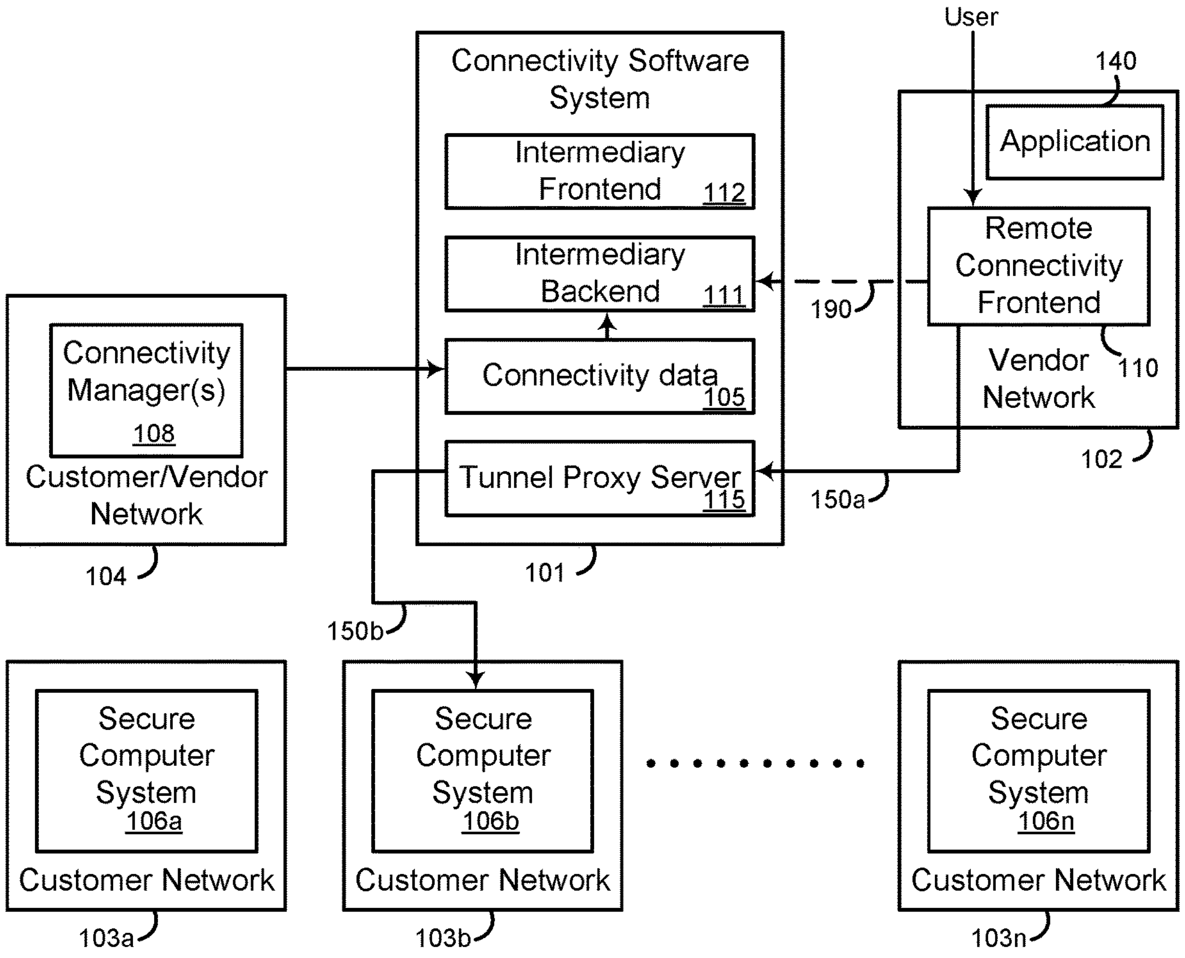
FIG. 1 illustrates a system for remote connectivity according to an embodiment.

FIG. 1 illustrates a system for remote connectivity according to an embodiment. Features and advantages of the present disclosure include a connectivity software system 101 that allows users, who may be an employee of a software vendor, to establish a secure connection to a plurality of different secure computer systems 106*a-n*, which may be operated by multiple different entities, such as customer software networks 103*a-n*, for example. Users access connectivity software 101 over a remote connectivity frontend 110, which may be deployed on a vendor software network 102, for example. Accordingly, users may be authorized within vendor software network 102, but the user may not be authorized within customer software network 103*a-n* or secure computer systems 106*a-n*. The user may be a support engineer, for example, and may desire access to secure computer systems 106*a-n* to provide technical support, custom development, or the like for the entity (e.g., customer). Connectivity software system 101 comprises software components that allow a user to connect to secure computer systems 106*a-n*.

Connectivity software system 101 comprises an intermediary backend 111 and intermediary frontend 112. Initially, intermediary backend 111 retrieves connectivity data 105 for secure computer systems 106*a-n* from one or more external systems 104. The external system(s) 104 storing the connectivity data may be a central system holding customer data in a vendor network, or alternatively, multiple customer connectivity managers 108 in each customer network as illustrated at 104 and described in more detail below. The connectivity data 105 may specify a plurality of connection types for each of the plurality of secure computer systems, for example. Different entities (e.g., different customers) may be associated with different connection types as well as other information described in more detail below. The connection process starts with the user accessing remote connectivity frontend system 110 (e.g., from the users computer (not shown)) and initiating a connection request. The connection request is received in intermediary backend system 111 as illustrated at 190. The user is authenticated in intermediary backend system 111 (e.g., based on the user's vendor network profile information and access rights) and granted access to intermediary frontend system 112, which is coupled to intermediary backend system 111 and provides access to the connectivity data 105. Once the user is connected to intermediary frontend system 112, the user may be presented with connectivity data 105. The connectivity data 105 may inform the user as to the available customers, connection types, and targets associated with connection types, as well as other information. For example, a user may be presented with connectivity data such as a connection type (e.g., an IP address or URL) for a plurality of target systems belonging to a particular customer. The user may select the connection type (and target) through intermediary frontend 112. Accordingly, intermediary frontend 112 receives a selection of a first connection type and a first secure computer system of secure computer systems 106*a-n* selected from the connection types for each of the secure computer systems presented to the user in the connectivity data 105.

Once a target and connection details are selected in the frontend 112, intermediary backend system 111 configures a tunnel proxy server 115 with the selected connectivity data to establish a connection between the remote connectivity frontend system 110 and the selected secure computer system (here, secure computer system 106*b*). The tunnel proxy server 115 establishes the selected connection type and other selected connectivity data attributes. Tunnel proxy server 115 may generate a first connection 150*a* between remote connectivity frontend 110 and tunnel proxy server 115 as well as generate a second connection 150*b* between tunnel proxy server 115 and secure computer system 106*b*, for example.

In one embodiment, the connection types are associated with a plurality of computer applications for remotely operating the secure computer systems 106*a-n*. Advantageously, an application 140 may be automatically launched when the connection is established with a particular connection type.

For instance, a connection type may dictate the target system that can be connected to, and different connection types may allow access to different target systems. Accordingly, the particular application 140 launched may be based on the selected connection type and corresponding target system, for example. Application 140 may allow the user to operate secure computer system 106*b* remotely, for example. As illustrated in examples below, a variety of applications may be launched automatically, further streamlining the process of connecting users to target systems.

Figure 2:
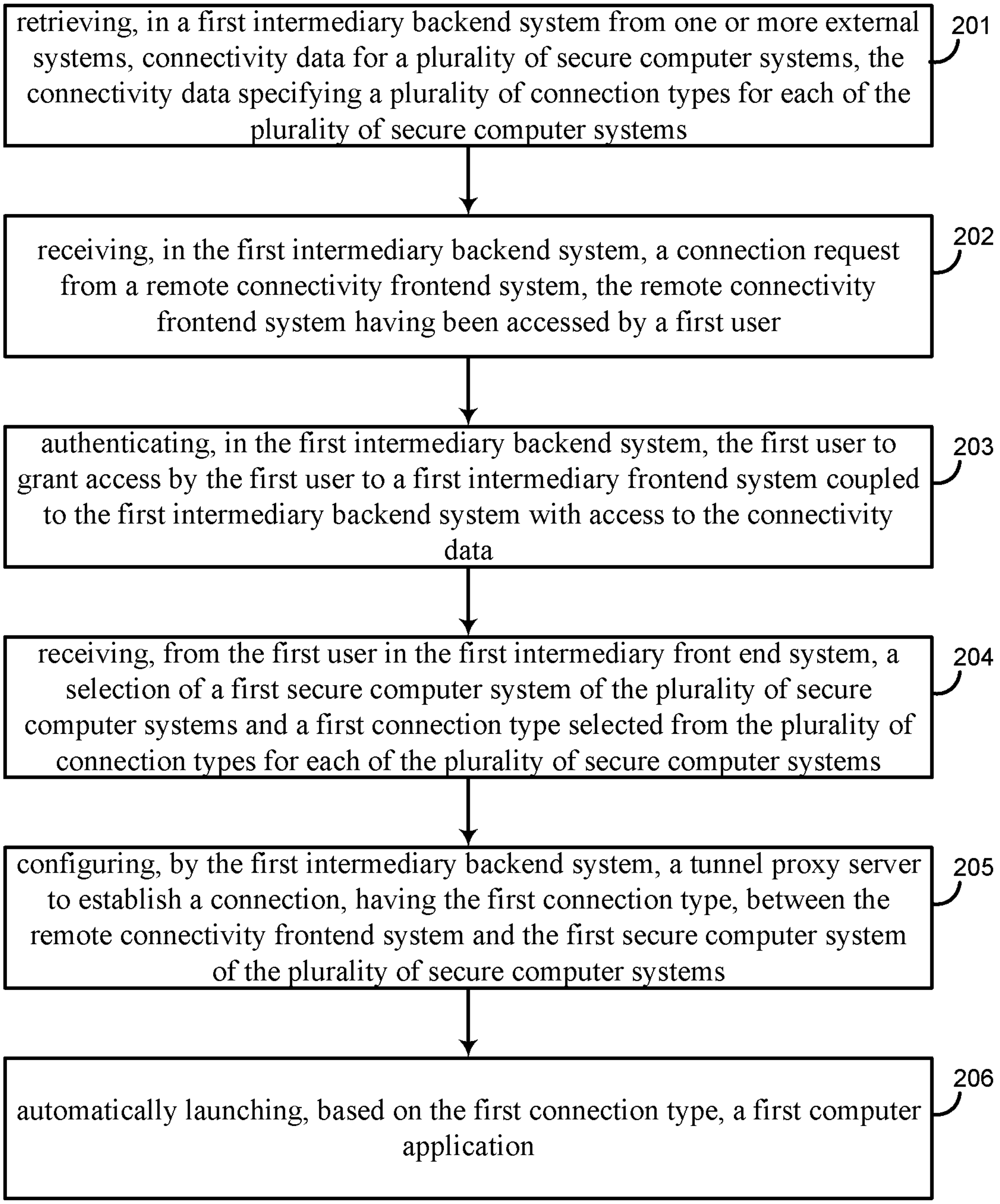
FIG. 2 illustrates a method for remote connectivity according to an embodiment.

FIG. 2 illustrates a method for remote connectivity according to an embodiment. At 201, connectivity data is retrieved from one or more external systems into a first intermediary backend system. The connectivity data may correspond to a plurality of secure computer systems (e.g., many targets for many customers, with many target systems for each customer). The connectivity data specifies a plurality of connection types for each of the plurality of secure computer systems. At 202, a first intermediary backend system receives a connection request from a remote connectivity frontend system, which was accessed by a user. At 203, the user is authenticated in the first intermediary backend system to grant access by the user to a first intermediary frontend system coupled to the first intermediary backend system with access to the connectivity data. At 204, the first intermediary frontend system receives, from the user, a selection of a first connection type selected from the plurality of connection types for each of the plurality of secure computer systems and a first secure computer system of the plurality of secure computer systems. At 205, the first intermediary backend system configures one or more tunnel proxy servers to establish a connection, having the first connection type, between the remote connectivity frontend system and the first secure computer system of the plurality of secure computer systems. In some embodiments, one or more of the connection types are associated with a computer application for remotely operating a particular secure computer system. Accordingly, at 206, the method further comprises automatically launching, based on the first connection type, a first computer application of said plurality of computer applications to allow the user to operate the first secure computer system.

Figure 3:
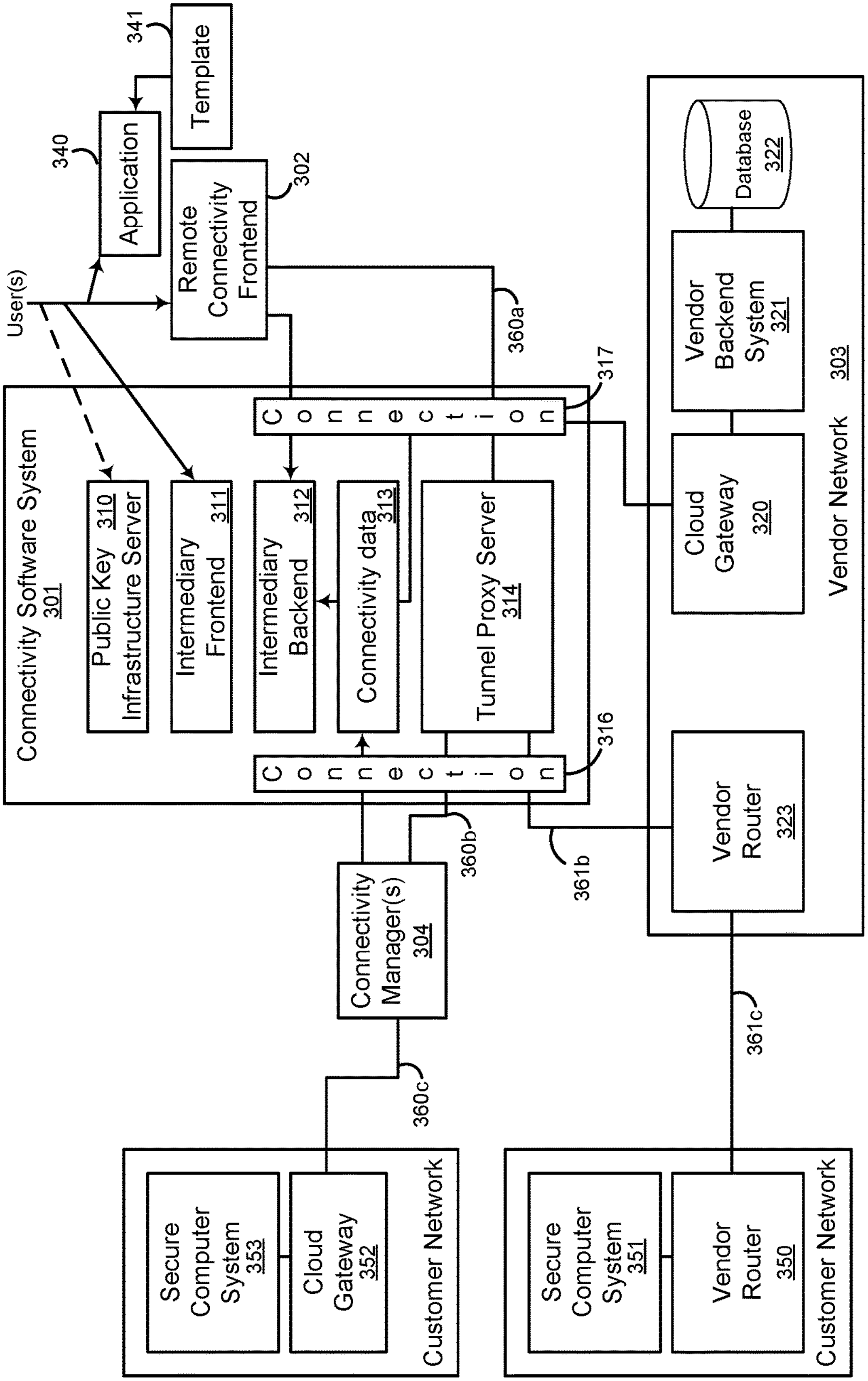
FIG. 3 illustrates an example remote connectivity system according to another embodiment.

FIG. 3 illustrates an example remote connectivity system according to another embodiment. In this example, a plurality of users may access remote connectivity frontend 302 to establish a connection to any of a number of target systems, such as secure computer systems 351 and 353. Initially, a user may access remote connectivity frontend 302 on the user's computer and connect to intermediary backend 312, which is a component of connectivity software system 301. Backend 312 may retrieve connectivity data 313 and make the connectivity data available to intermediary frontend 311. Once authorized by backend 312, the user may access connectivity data 313 thru frontend 311.

As mentioned above, in various embodiments, the connectivity data may be stored on a vendor's system or each customer's system. In the former case, the external system comprises a database 322 storing connectivity data for the plurality of secure computer systems. In this case, intermediary backend 312 accesses vender backend system 321 (e.g., through cloud gateway 320) to query the connectivity data from one or more databases 322, for example. Connection software 317 may include information for passing firewalls or other information to allow the connection to occur, for example. In other cases, each of the secure computer systems store the connectivity data independently. In this example, a customer associated with secure computer system 353 has a connection manager 304, which stores connectivity data for the customer.

As mentioned above, connectivity data may include a variety of data for establishing a connection between a user and a target system. Connectivity data may include connection types for each customer, for example. For example, secure target computer systems may be accessed using Internet Protocol (IP) addresses (e.g., servers and databases) or by using Uniform Resource Locators (URLs) (e.g., links in the target system to other systems). Accordingly, the connection types for the plurality of secure computer systems may be Internet Protocol (IP) addresses or Uniform Resource Locators (URLs). In some embodiments, the connectivity data comprises entity defined constraints to limit access to an entity's secure computer systems. For example, a customer may define constraints, included in the connectivity data, that specify allowable connection types. Other entity defined constraints may specify particular aspects of profile information associated with the user. For instance, intermediary backend system 312 may retrieve profile information associated with the user and deny access to some or all of the available connection types based on one or more elements of the profile information associated with the user. For example, users in particular geographic locations may be denied access to certain systems due to export control issues (e.g., passport checks), users without certain job titles may be excluded from access, or some customers may only allow access by particular users, for example. In some embodiments, the entity defined constraints specify at a time limit for a connection type. For instance, certain users performing particular tasks may be granted access for a certain number of hours, days, or weeks before being automatically blocked. As mentioned above, the entity defined constraints may deny access to users based on a geographic region. Additionally, in some embodiments, the entity defined constraints specify at least one valid reason for accessing a particular secure computer system. For instance, the intermediate frontend may display a plurality of reasons to the user. The user may select a "reason" for access when selecting the customer and connection type, for example. When the user selects a reason that matches a valid reason (e.g., for the particular user), then access is granted. Each user may be associated with different valid reasons based on number of criteria, including the user's profile, the target system the user is seeking to connect to, dates and/or time, and the like. However, when the user selects a reason that does not match a valid reason, then access is denied. In some optional example embodiments, the user's selections may be logged and monitored for security concerns. If the system logs a plurality of selected reasons resulting in denials of access, the system may generate a security audit when a number of reasons resulting in denials meets a threshold. This may advantageously catch users who attempt to enter target systems without authorization, for example.

Frontend 311 may present the user with a corpus of searchable connectivity data for one or more customer entities, including connectivity types and target systems. The user may select particular customers, connection types, and target systems (e.g., based on IP address or URLs). For example, a user may select a particular customer and be presented with connectivity data for that customer. Accordingly, the present disclosure advantageously allows users to navigate across a wide range of systems to find the system they want to connect to, and then automatically establish the connection to the target system. As mentioned above, the system advantageously has the ability to "smartly" determine which users should be allowed access to which systems.

Once the user selects a connection type and corresponding system to connect to, intermediary backend 312 configures a tunnel proxy server to establish the connection. If an appropriate tunnel proxy server already exists, backend 312 may reconfigure the tunnel proxy server to include the connection for the user. For example, backend 312 may pin the user to a particular port of a tunnel proxy server and configure the tunnel proxy server to connect to the target system. Connections between the tunnel proxy server and target system may vary based on the software environment. For instance, in this example, tunnel proxy server 314 is configured to establish a connection 360 to remote connectivity framework frontend 302. Additionally, since the target secure computer system 353 is operating in a cloud environment, tunnel proxy server 314 is further configured to establish connection 360*b* to connectivity manager 304, which is connected to cloud gateway 352 over connection 360*c*. In another embodiment, the target secure computer system 351 may be accessed over a sequence of vendor software routers 350 and 323. Accordingly, tunnel proxy server 314 is configured to establish a connection 361*b* to vendor router 323, which in turn is coupled to target system 351 through connection 361*c* and vendor router 350.

Features and advantages of the present disclosure may include optimizing performance of the connections. For example, a backend 312 may generate a tunnel proxy server in a different location to reduce the length of the connection between the user and the target. For example, the tunnel proxy server may be generated and configured to operate in a different geographical region than intermediary backend system 312. The geographic location of the tunnel proxy server may be selected based on a location of the user and a location of the first secure computer system being connected. The location of the tunnel proxy server may be selected to ensure the connection does not extend longer distances than necessary, thereby negatively impacting the performance of the connection, for example.

As mentioned above, some embodiments may automatically launch a particular computer application to allow the user to operate the target computer system based on the connection type. For instance, in some embodiments, connection types may be associated with application launch templates. The application launch templates may be configured from the customer data (e.g., including portions of the connectivity data) to configure and launch the associated computer application once the connection is established to the target system. In this example, a template 341 is populated (e.g., by backend 312) and used to launch application 340. In particular, a launch request may instruct the tunnel proxy server 314 to instruct remote connectivity frontend 302 to fill out the launch template to launch the application. The template may be executed similar to a dynamic command line to launch the application in the remote connectivity frontend 302, for example. Example connection types and applications may include: an R/3 automatically launching a graphical user interface (GUI), an HTTP connection automatically launching a browser, a window terminal connection automatically launching a remote desktop connection, or a custom database connection automatically launching a custom database studio, for example.

Authorization of users attempting to establish connections to the target systems may be implemented using a variety of techniques. In some embodiments, a temporary client certificate may be generated and retrieved from a dedicated isolated Central Public Key (CPK) infrastructure to realize Single Sign-On (SSO) to the customer end system ensuring personalization anonymity. Accordingly, in the example shown in FIG. 3, connectivity software system 301 includes public key server 310. Certificates may be issued by a central public key infrastructure server 310. The certificates may be trusted by entities, such as customers, who control access rights to secure computer systems 351 or 353, for example. After a user is authenticated and authorized by backend 312, a certificate may be issued to the user. The certificate grants the user access rights to the target computer system. In some embodiments, the certificate may have a predefined time period. Accordingly, the certificate may become invalid a predefined time period after the user first accesses the first secure computer system.

In other embodiments, the entity controlling authorization of the secure computer system may configure the target system with a user account login and password dedicated to the user, for example. Accordingly, after establishing the connection between the remote connectivity frontend system 302 and a secure computer system, the user may access a secure computer system by entering the user account logic and password.

Figure 4:
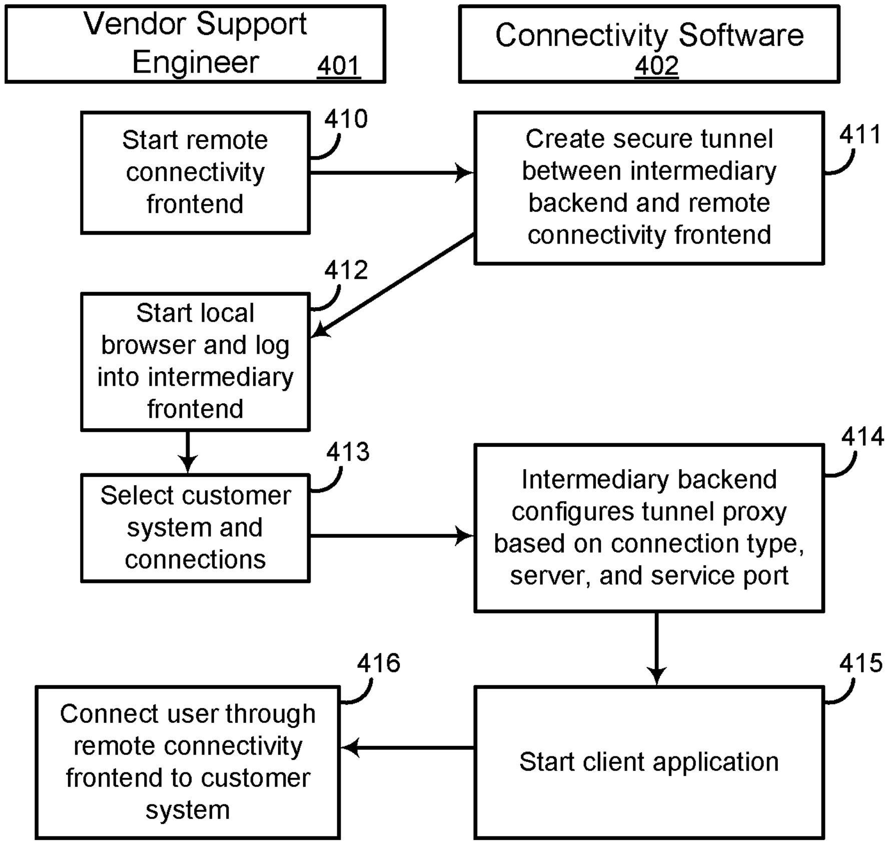
FIG. 4 illustrates an example flow diagram for establishing a remote connection according to another embodiment.

FIG. 4 illustrates an example flow diagram for establishing a remote connection according to another embodiment. In this example, a vendor support engineer 401 may start a remote connectivity frontend at 410. At 411, connectivity software 402 creates a secure tunnel between an intermediary backend and the remote connectivity frontend. At 412, a local browser is started and the user logs into the intermediary frontend. At 413, the user selects a customer system and connections. At 414, the intermediary backend configures the tunnel proxy based on the selected connection type, server, and service port, for example. At 415, a client application is automatically launched the user's computer system, allowing the user to perform work on the customer's system. At 416, the user is connected to the customer system through the remote connectivity frontend.

The above described example system may include some or all of the following features and advantages not found in typical remote connection solutions. Some embodiments may establish one standardized remote connectivity solution, and infrastructure, on the vendor's software platform, which will enable vendor customers to utilize a modern, de-centralized, highly available, reliable, and simplified environment to access the heterogenous customer solutions. Certain embodiments may provide an unattended logical VPN access on application, and system level, to dedicated selected servers behind a firewall for the deployment vendor models (e.g., Cloud, Hyperscaler, On-Premise and Hybrid). Some embodiments may provide, through data included in the connectivity data, an advanced secure framework including technical measurements to comply with contractual and legal regulations as well as limiting remote access of certain user groups, citizens of specific countries or physical user locations. Some embodiments may provide a new modular and flexible architecture enables an easy integration of new products, service portfolio enhancements, as well as new business models and processes. Some embodiments may provide a dedicated Public Key Infrastructure (PKI) for generating temporary client certificates to securely support personalization anonymity, and a remote single sign-on solution, to vendor cloud products. Some embodiments may provide a self-service to customers, support engineers, and network experts, to perform an end-to-end logical network test for all remote connection types. Some embodiments may decrease the total cost of ownership (TCO) for servicerelated IT landscapes, by introducing partial/full automation e.g., transforming to the Cloud, and standardized infrastructures, requiring less development and maintenance cost. Some embodiments may increase customer satisfaction and product renewal rate (e.g., due to fast incident resolution, higher value proposition of a vendor's service offerings by holistic custom development projects, and consulting services. Certain embodiments may establish a platform which allows remote connectivity developers to focus on high value tasks, and innovation, maximizing the business outcome. Some embodiments may provide reliable 24×7 platform availability for current and future business models to enable the supportability of the "follow the sun support principle" for customers. Some embodiments may ensure proper chronological logging and archiving of remote access information in compliance with regional data protection regulations. Some embodiments may route traffic in an optimized way that takes the physical location of technical specialists and accessed customer systems into account, to minimize network latency.

Figure 5:
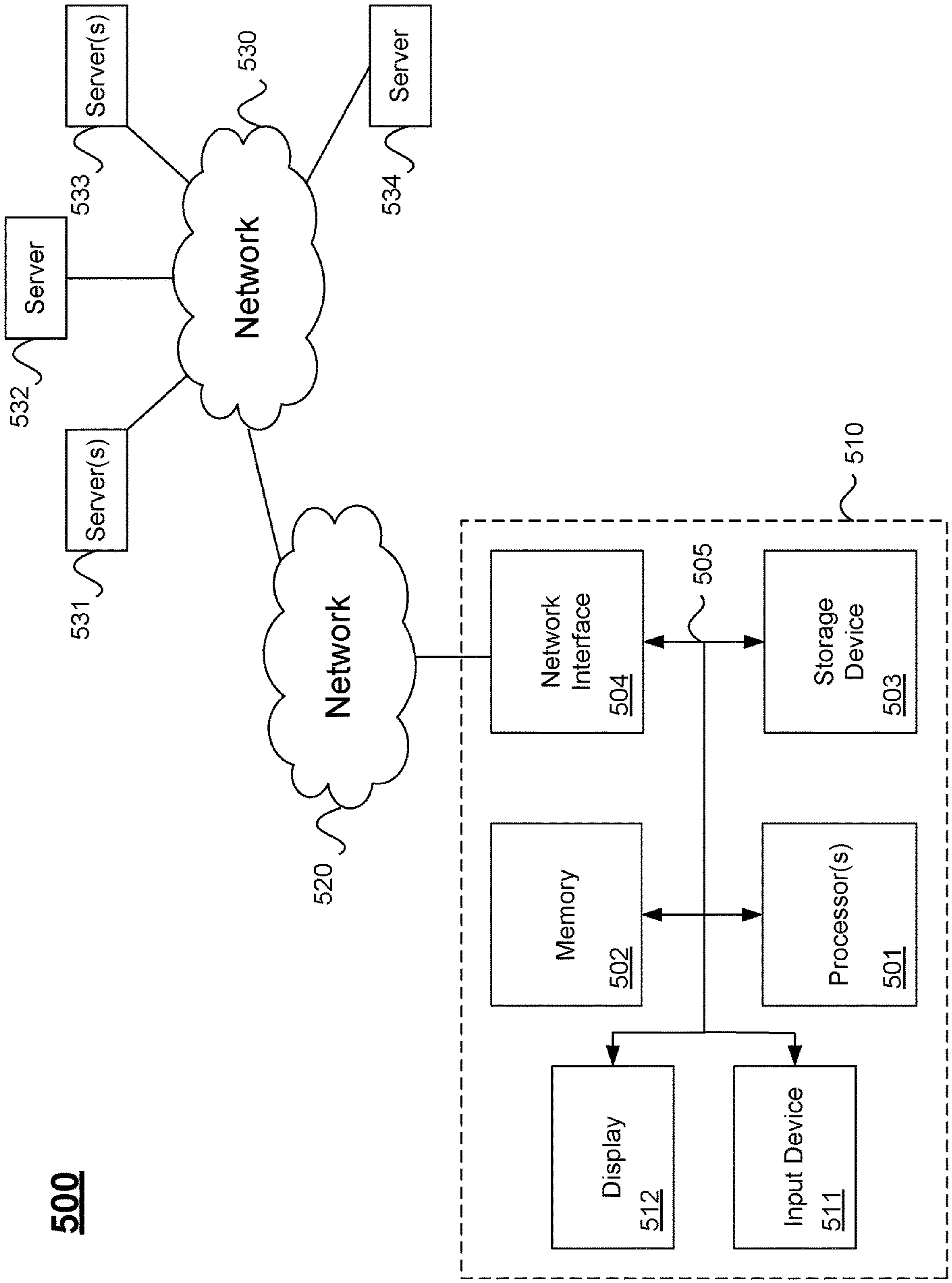
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method of connecting computer systems as described herein and in the following examples. In another embodiment, the present disclosure includes a non-transitory computer-readable medium storing computer-executable instructions that, when executed by at least one processor, perform a method of connecting computer systems as described herein and in the following examples. In another embodiment, the present disclosure includes a method of connecting computer systems comprising: retrieving, in a first intermediary backend system from one or more external systems, connectivity data for a plurality of secure computer systems, the connectivity data specifying a plurality of connection types for each of the plurality of secure computer systems; receiving, in the first intermediary backend system, a connection request from a remote connectivity frontend system, the remote connectivity frontend system having been accessed by a first user; authenticating, in the first intermediary backend system, the first user to grant access by the first user to a first intermediary frontend system coupled to the first intermediary backend system with access to the connectivity data; receiving, from the first user in the first intermediary frontend system, a selection of a first connection type selected from the plurality of connection types for each of the plurality of secure computer systems and a first secure computer system of the plurality of secure computer systems; and configuring, by the first intermediary backend system, one or more tunnel proxy servers to establish a connection, having the first connection type, between the remote connectivity frontend system and the first secure computer system of the plurality of secure computer systems.

In one embodiment, one or more of the connection types are associated with a computer application for remotely operating a particular secure computer system, the method further comprising automatically launching, based on the first connection type, a first computer application of said plurality of computer applications to allow the user to operate the first secure computer system.

In one embodiment, one or more of the connection types are associated with an application launch template to configure and launch the associated computer application.

In one embodiment, the method further comprising: issuing one or more certificates a central public key infrastructure server; and after said authenticating step, issuing a first certificate to the user, the first certificate granting the user access rights to the first secure computer system of the plurality of secure computer systems.

In one embodiment, the first certificate has a predefined time period, and wherein the first certificate becomes invalid said predefined time period after the user first accesses the first secure computer system.

In one embodiment, the first secure computer system comprises a user account login and password dedicated to the user, and after establishing the connection, having the first connection type, between the remote connectivity frontend system and the first secure computer system, the user accesses the first secure computer system by entering the user account logic and password.

In one embodiment, the external system comprises a database storing connectivity data for the plurality of secure computer systems.

In one embodiment, each of the plurality of secure computer systems stores the connectivity data independently, and the one or more external systems are a plurality of external systems corresponding to the plurality of secure computer systems.

In one embodiment, the tunnel proxy server establishes a connection to the first secure computer system through a cloud gateway.

In one embodiment, the tunnel proxy server establishes a connection to the first secure computer system through a plurality of software routers.

In one embodiment, the tunnel proxy server operates in a different geographical region than the first intermediary backend system, and wherein a first geographic location of the tunnel proxy server is selected based on a location of the user and a location of the first secure computer system being connected.

In one embodiment, the plurality of secure computer systems comprise a plurality of secure computer systems for a plurality of entities, and wherein the user selects a first entity from the plurality of entities in the first intermediary frontend system and the user is presented with a portion of the plurality of secure computer systems for the first entity.

In one embodiment, the connectivity data comprises entity defined constraints to limit access to the plurality of secure computer systems for the plurality of entities.

In one embodiment, the entity defined constraints specify allowable connection types.

In one embodiment, the entity defined constraints specify at least a portion of profile information associated with the user, wherein the first intermediary backend system retrieves first profile information associated with the user and denies access to some or all of the connection types based on one or more elements of the profile information associated with the user.

In one embodiment, the entity defined constraints specify at a time limit for a connection type.

In one embodiment, the entity defined constraints deny access to users based on a geographic region.

In one embodiment, the entity defined constraints specify at least one valid reason for accessing a particular secure computer system, wherein the intermediate frontend displays a plurality of reasons to the user, and wherein when the user selects a reason that matches the at least one valid reason, then access is granted, and wherein when the user selects a reason that does not match the at least one valid reason, then access is denied, the method further comprising logging a plurality of selected reasons resulting in denials of access and generating a security audit when a number of reasons resulting in denials meets a threshold.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of connecting computer systems comprising:

retrieving, in a first intermediary backend system from one or more external systems, connectivity data for a plurality of secure computer systems, the connectivity data specifying a plurality of connection types for each customer for each of the plurality of secure computer systems, the plurality of connection types comprising an Internet Protocol address and universal resource locator, wherein the connectivity data further comprises entity-defined constraints associated with the plurality of secure computer systems;

receiving, in the first intermediary backend system, a connection request from a remote connectivity frontend system, the remote connectivity frontend system having been accessed by a first user;

authenticating, in the first intermediary backend system, the first user to grant access by the first user to a first intermediary frontend system coupled to the first intermediary backend system with access to the connectivity data;

presenting, via the first intermediary frontend system, a plurality of selectable reasons corresponding to a first secure computer system;

receiving, from the first user in the first intermediary frontend system, a selection of a first connection type selected from the plurality of connection types for each of the plurality of secure computer systems and the first secure computer system of the plurality of secure computer systems;

receiving, from the first user, a selected reason corresponding to the first secure computer system;

determining, by the first intermediary backend system and prior to establishing the connection, whether the selected reason satisfies at least one valid reason specified by the entity-defined constraints;

granting access when the selected reason satisfies the at least one valid reason and denying access when the selected reason does not satisfy the at least one valid reason;

in response to denying access, logging the selected reason, and generating a security audit when a number of denied access events meets a threshold;

configuring, by the first intermediary backend system, one or more tunnel proxy servers to establish a connection, having the first connection type, between the remote connectivity frontend system and the first secure computer system of the plurality of secure computer systems responsive to granting access; and automatically launching, based on the first connection type, a first computer application of a plurality of computer applications to allow the first user to operate the first secure computer system, wherein the first computer application is launched using an application launch template associated with the first connection type and populated based on the connectivity data.

2. The method of claim 1, wherein one or more of the connection types are associated with an application launch template to configure and launch an associated computer application.

3. The method of claim 1, further comprising:

issuing one or more certificates a central public key infrastructure server; and after the authenticating step, issuing a first certificate to the first user, the first certificate granting user access rights to the first secure computer system of the plurality of secure computer systems.

4. The method of claim 3, wherein the first certificate has a predefined time period, and wherein the first certificate becomes invalid said predefined time period after the first user first accesses the first secure computer system.

5. The method of claim 1, wherein the first secure computer system comprises a user account login and password dedicated to the first user, and after establishing a connection, having the first connection type, between the remote connectivity frontend system and the first secure computer system, the first user accesses the first secure computer system by entering the user account login and password.

6. The method of claim 1, wherein an external system of the one or more external systems comprises a database storing connectivity data for the plurality of secure computer systems.

7. The method of claim 1, wherein each of the plurality of secure computer systems stores the connectivity data independently, and the one or more external systems are a plurality of external systems corresponding to the plurality of secure computer systems.

8. The method of claim 1, wherein a tunnel proxy server of the one or more tunnel proxy servers establishes a connection to the first secure computer system through a cloud gateway.

9. The method of claim 1, wherein a tunnel proxy server of the one or more tunnel proxy servers establishes a connection to the first secure computer system through a plurality of software routers.

10. The method of claim 1, wherein a tunnel proxy server of the one or more tunnel proxy servers operates in a different geographical region than the first intermediary backend system, and wherein a first geographic location of the tunnel proxy server is selected based on a location of the first user and a location of the first secure computer system being connected.

11. The method of claim 1, wherein the plurality of secure computer systems comprise a plurality of secure computer systems for a plurality of entities, and wherein the first user selects a first entity from the plurality of entities in the first intermediary frontend system and the first user is presented with a portion of the plurality of secure computer systems for the first entity.

12. The method of claim 1, wherein the connectivity data comprises entity defined constraints to limit access to the plurality of secure computer systems for a plurality of entities.

13. The method of claim 12, wherein the entity defined constraints specify allowable connection types.

14. The method of claim 12, wherein the entity defined constraints specify at least a portion of profile information associated with the first user, wherein the first intermediary backend system retrieves first profile information associated with the first user and denies access to some or all of the connection types based on one or more elements of the profile information associated with the first user.

15. The method of claim 12, wherein the entity defined constraints specify at a time limit for a connection type.

16. The method of claim 12, wherein the entity defined constraints deny access to users based on a geographic region.

17. A computer system comprising:

at least one processor;

at least one non-transitory computer readable medium storing computer executable instructions that, when executed by the at least one processor, cause the computer system to perform a method of connecting computer systems comprising:

retrieving, in a first intermediary backend system from one or more external systems, connectivity data for a plurality of secure computer systems, the connectivity data specifying a plurality of connection types for each customer for each of the plurality of secure computer systems, the plurality of connection types comprising an Internet Protocol address and universal resource locator, wherein the connectivity data further comprises entity-defined constraints associated with the plurality of secure computer systems;

receiving, in the first intermediary backend system, a connection request from a remote connectivity frontend system, the remote connectivity frontend system having been accessed by a first user;

authenticating, in the first intermediary backend system, the first user to grant access by the first user to a first intermediary frontend system coupled to the first intermediary backend system with access to the connectivity data;

presenting, via the first intermediary frontend system, a plurality of selectable reasons corresponding to a first secure computer system;

receiving, from the first user in the first intermediary frontend system, a selection of a first connection type selected from the plurality of connection types for each of the plurality of secure computer systems and the first secure computer system of the plurality of secure computer systems;

receiving, from the first user, a selected reason corresponding to the first secure computer system;

determining, by the first intermediary backend system and prior to establishing the connection, whether the selected reason satisfies at least one valid reason specified by the entity-defined constraints;

granting access when the selected reason satisfies the at least one valid reason and denying access when the selected reason does not satisfy the at least one valid reason;

in response to denying access, logging the selected reason, and generating a security audit when a number of denied access events meets a threshold;

configuring, by the first intermediary backend system, one or more tunnel proxy servers to establish a connection, having the first connection type, between the remote connectivity frontend system and the first secure computer system of the plurality of secure computer systems responsive to granting access; and automatically launching, based on the first connection type, a first computer application of a plurality of computer applications to allow the first user to operate the first secure computer system, wherein the first computer application is launched using an application launch template associated with the first connection type and populated based on the connectivity data.

18. A non-transitory computer-readable medium storing computer-executable instructions that, when executed by at least one processor, perform a method of connecting computer systems, the method comprising:

retrieving, in a first intermediary backend system from one or more external systems, connectivity data for a plurality of secure computer systems, the connectivity data specifying a plurality of connection types for each customer for each of the plurality of secure computer systems, the plurality of connection types comprising an Internet Protocol address and universal resource locator, wherein the connectivity data further comprises entity-defined constraints associated with the plurality of secure computer systems;

receiving, in the first intermediary backend system, a connection request from a remote connectivity frontend system, the remote connectivity frontend system having been accessed by a first user;

authenticating, in the first intermediary backend system, the first user to grant access by the first user to a first intermediary frontend system coupled to the first intermediary backend system with access to the connectivity data;

presenting, via the first intermediary frontend system, a plurality of selectable reasons corresponding to a first secure computer system;

receiving, from the first user in the first intermediary frontend system, a selection of a first connection type selected from the plurality of connection types for each of the plurality of secure computer systems and the first secure computer system of the plurality of secure computer systems;

receiving, from the first user, a selected reason corresponding to the first secure computer system;

determining, by the first intermediary backend system and prior to establishing the connection, whether the selected reason satisfies at least one valid reason specified by the entity-defined constraints;

granting access when the selected reason satisfies the at least one valid reason and denying access when the selected reason does not satisfy the at least one valid reason;

in response to denying access, logging the selected reason, and generating a security audit when a number of denied access events meets a threshold;

configuring, by the first intermediary backend system, one or more tunnel proxy servers to establish a connection, having the first connection type, between the remote connectivity frontend system and the first secure computer system of the plurality of secure computer systems responsive to granting access; and automatically launching, based on the first connection type, a first computer application of a plurality of computer applications to allow the first user to operate the first secure computer system, wherein the first computer application is launched using an application launch template associated with the first connection type and populated based on the connectivity data.

* * * * *